3,099,683
TRIS MALEIC ACID AND FUMARIC ACID HALF-ESTERS OF C₆ TO C₁₀ SATURATED TRIOLS
Alfred J. L. Toombs, Berkeley, Calif., assignor to Shell Oil Company, New York, N.Y., a corporation of Delaware
No Drawing. Filed Feb. 27, 1961, Ser. No. 91,583
7 Claims. (Cl. 260—485)

The invention relates to novel ethylene dicarboxylic acid half esters of triols having a unique structure which gives them especially advantageous properties.

The ethylene dicarboxylic acids are maleic and fumaric acids. Esters of these acids with various polyols having three or more hydroxyl groups, such, for instance, as glycerol, pentaerythritol and the like, have been prepared, especially in connection with alkyd resin manufacture. For this purpose linear polyesters are preferred and while some of these have been acid terminated, and in this sense have been half esters, they have not been esters in which each of the hydroxyl groups of the starting polyols has been esterified with a different molecule of ethylene dicarboxylic acid as is the case with the new tri-maleic and fumaric acid half esters of the triols of the invention. Usually these prior art esters have contained unesterified hydroxyl groups which make them undesirable in certain applications. In some cases these free hydroxyl groups have been eliminated by esterification with a different type of acid or by etherification. Either of these procedures results in a final product with an undesirable variation in the reactivity of its different groups. This limits the applications of the esters in a way not encountered with the present new tri-maleates and tri-fumarates.

As previously indicated the ethylene dicarboxylic acid half esters are esters of a special type of triol. These triols must contain a carbinol group which is separated by at least three carbon atoms from the other carbinol carbon atoms in the molecule. Particularly useful are the tri-half esters of aliphatic polyols of 6 to 10 carbon atoms per molecule composed only of carbon, hydrogen and hydroxyl oxygen atoms and containing a pair of carbinol groups which are separated from each other by not more than one carbon atom and having another carbinol group removed from said pair of carbinol groups by at least three intervening carbon atoms. Especially advantageous half esters are those represented by the formula

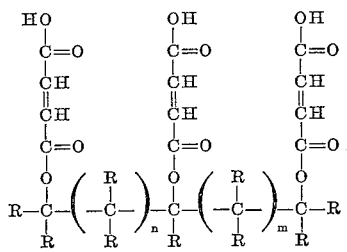

where each R represents a hydrogen atom or a lower alkyl radical of preferably not more than 3 carbon atoms, $n$ is zero or one and $m$ is an integer equal to three but not more than seven minus $n$. Half esters of this formula in which $n$ is zero have especially desirable properties. Particularly useful are those derived from triols having at least two primary hydroxyl groups, especially the hexanetriols possessing a straight chain of six carbon atoms to which all three of the hydroxyl groups are attached, two of the hydroxyl groups being linked to the two terminal carbon atoms of the chain and the third hydroxyl group being attached to the second carbon atom of the chain.

The new half esters contain three carboxylic acid groups which not only are each activated by an alpha,beta-ethylenic group but also have essentially equal reactivities. The unique spacing of these half-ester groups along the alkane chain imparts special properties not found in the symmetrical esters, such as those of glycerol and the like. If triols having the third hydroxyl more closely linked to the indicated pair of carboxyl groups are used in making the new compounds the half esters are less useful, especially as cross-linking agents when used with diepoxides to cure polycarboxy rubbers such as the dicarboxy terminated polybutadienes, or when used to cross-link diepoxides. It is also essential that polyols of the indicated type having only the three specified hydroxyl groups be used in making the esters since any additional hydroxyl group would interfere in this important use of the new half esters by imparting increased functionality. This leads to undesirable side reactions, particularly excessive cross-linking between polycarboxyepoxy rubber chains.

As indicated above, the starting triols advantageously contain 6 to 10 carbon atoms per molecule. Particularly useful are those having two primary carbinol groups linked by a polymethylene chain of 3 to 7 carbon atoms to the carbinol carbon atom of a pair of adjacent carbinol groups. Typical of this preferred type of triol which is especially useful for producing the new half esters of maleic and/or fumaric acid are, for instance, 1,2,6-hexanetriol; 1,2,7-heptanetriol; 3-methyl-1,2,6-hexanetriol; 2-ethyl-1,2,6-hexanetriol; 5-isopropyl-1,2,6-hexanetriol; 3,5-dimethyl-1,2,6-hexanetriol; 6-methyl-1,2,7-heptanetriol; 1,2,8-octanetriol, and 1,2,10-decanetriol. Representative examples of the starting triols which have two primary carbinol groups but are less preferred because a carbon atom separates the pair of most closely linked carbinol groups are 1,3,7-heptanetriol; 2-hydroxymethyl-1,6-hexanediol; 1,3,8-octanetriol; 2-methyl-1,3,7-heptanetriol; 4-ethyl-1,3,7-heptanetriol; 1,3,9-nonanetriol, and 2-hydroxymethyl-1,9-nonanediol. Among other triols usable for making new tri-half esters according to the invention are the following compounds which are less preferred because they do not contain two primary hydroxyl groups in the molecule: 2,3,7-heptanetriol; 2-methyl-2,3,7-heptanetriol; 2,3,7-octanetriol, and 2,4,9-decanetriol.

The new half esters are conveniently made by esterifying the chosen triol or mixture of such triols by reaction with maleic anhydride or with maleic or fumaric acid. The reaction, especially when using maleic anhydride as the esterifying agent, is exothermic and requires careful control of bath temperature and proportions of reactants in order to prevent excessive gel formation which results from linking together of two or more triol molecules during esterification. On this account it is important to insure the reaction of approximately three mols of the acid or anhydride with each mol of triol used. This is most readily achieved by maintaining this ratio of the reactants in the reaction mixture throughout most of the reaction period. However, an excess of one or the other of the reactants, most preferably of the triol, during the early stages of the reaction, as when the reactants are being brought up to reaction temperature, is not ordinarily detrimental. Thus one suitable method of batchwise reaction comprises adding maleic anhydride in increments to the chosen triol at a temperature at which the anhydride dissolves in the alcohol without excessive reaction, for instance, about 70–80° C. After all the required anhydride has been added the temperature is raised to reaction temperature but not so high as to lead to excessive evolution of heat. Advantageously temperatures between about 85° and about 100° C. can be used for the reaction, with higher temperatures, e.g., about 90° to about 125° C., being suitable especially in the final stages. Depending upon the temperature, the reaction will be essentially complete in about 8 to 14 hours in this method of operation.

Where maleic and/or fumaric acid is used instead of the anhydride, provision should be made for removal of the water formed in the reaction. This is conveniently effected by continuously distilling off the water as fast as it is formed. Preferably the distillation is conducted under reduced pressure, especially in the initial stages of the esterification where it is important to keep the temperature below 100° C.

Esterification catalysts can be used to achieve faster rates of reaction and/or shorter reaction times but they are not essential for successful production of the new half esters. Suitable catalysts are, for instance, acids such as sulfuric, phosphoric, hydrochloric, methane or toluene sulfonic, and like acids. Very small catalytic amounts of the order of about 0.001 to about 0.1 mole per mole of the triol being esterified are usually sufficient.

Instead of batch reaction, the esterification can be carried out intermittently or continuously.

The new half esters also can be produced in other ways than by the indicated esterification of the specified triols. One can for instance carry out the esterification with maleic or fumaric monoacid chloride as illustrated by the following equation:

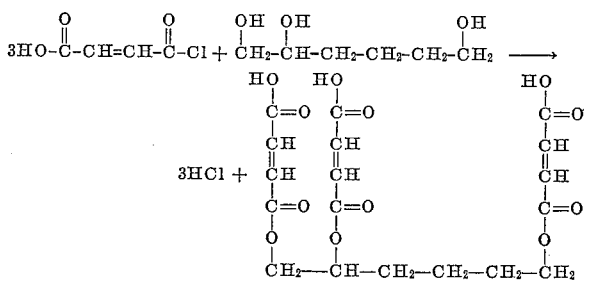

This reaction proceeds more smoothly when the triol is converted to the alkoxide, for instance, the sodium alkoxide

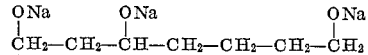

before reaction with the acid chloride.

The following examples illustrate the production of the new compounds of the invention in more detail but it will be understood that the invention is not limited thereto.

*Example I*

A stirred flask provided with a reflux condenser was charged with 134 grams (1 mole) of 1,2,6-hexanetriol and heated to about 70–80° C. Over a period of about one-half hour, 294 grams (3 moles) of maleic anhydride was added, dissolving to form a viscous homogenous solution. After addition of the maleic anhydride was complete the temperature was raised to between 80° and 90° C. Exothermic reaction took place in this temperature range and the mixture was cooled intermittently when the temperature rose above 90° C. After about three and one-half hours, the temperature was raised to 90° to 100° C. and maintained in this range for 8 hours. Titration with 0.01 N sodium hydroxide of samples taken from the reaction mixture using phenophthalein as the indicator gave the following results:

After 3½ hours at 80°–90° C. Equivalent weight of acid product__ 124.
After 4 more hours at 90°–100° C. Equivalent weight of acid product__ 133.5.
At end of test Equivalent weight of acid product__ 140.
Theoretical equivalent weight of tri-maleic acid half ester of 1,2,6-hexanetriol__ 143.

This corresponds to over 90% yield of the half ester.

Analysis of the distilled product gave the following results:

|  | Found | Theoretical |
|---|---|---|
| Acidity (equivalents per 100 grams) | 0.715 | 0.70 |
| Ester Value (equivalents per 100 grams) | 0.66 | 0.70 |
| Anhydride Value (equivalents per 100 grams) | 0.027 | zero |

*Example II*

Using the method of Example I the following maleic acid half esters (which are named as tri(hydroxymaleoyloxy) alkanes where the specified hydroxymaleoyloxy groups have the formula

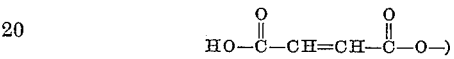

are made from the indicated triols:

4-methyl-1,2,6-tri(hydroxymaleoyloxy)hexane from 4-methyl-1,2,6-hexanetriol 2-methyl-2,3,7-tri(hydroxymaleoyloxy)heptane from 2-methyl-2,3,7-heptanetriol 1,2,6-tri(hydoxylmaleoyloxy)heptane from 1,2,6-heptanetriol 1,2,6-tri(hydroxymaleoyloxy)octane from 1,2,6-octanetriol 1,3,8-tri(hydroxymaleoyloxy)octane from 1,3,8-octanetriol 1,2,9-tri(hydroxymaleoyloxy)nonane from 1,2,9-nonanetriol 1,3,10-tri(hydroxymaleoyloxy)decane from 1,3,10-decanetriol

*Example III*

The following trifumerates, named as tri(hydroxyfumeoyloxy) alkanes where the specified hydroxyfumeoyloxy groups have the formula

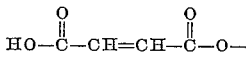

can be made from the indicated triols:

2-methyl-1,2,6-tri(hydroxyfumeoyloxy)hexane from 2-methyl-1,2,6-hexanetriol 3,4,5-trimethyl-1,2,6-tri(hydroxyfumeoyloxy)hexane from 3,4,5-trimethyl-1,2,6-hexanetriol 2-ethyl-1,2,7-tri(hydroxyfumeoyloxy)heptane from 2-ethyl-1,2,7--heptanetriol 1,3,7-tri(hydroxyfumeoyloxy)octane from 1,3,7-octanetriol 2-methyl-1,3,8-tri(hydroxyfumeoyloxy)nonane from 2-methyl-1,3,8-nonanetriol 1,3,10-tri(hydroxyfumeoyloxy)decane from 1,3,10-decanetriol Because of the tendency of fumaric acid to isomerize to maleic acid, the products in these cases may contain a minor amount of maleic acid half ester but this is not detrimental since in most applications the hydroxymaleoyloxy and hydroxyfumeoyloxy groups give essentially the same results in these compounds.

*Example IV*

The new tri-half esters of ethylene dicarboxylic acids are outstanding curing agents for epoxy resins as shown by the following representative results for the cure of a glycidyl polyether of 2,2-bis(4-hydroxyphenyl)propane having an epoxy value of 0.50 equivalent per 100 grams and a molecular weight of about 350 which is the Polyether A of U.S. Patent 2,633,458.

The following mixture was cured 4 hours at 125° C.

| | Parts |
|---|---|
| Polyether A | 100 |
| Tris maleic half ester of 1,2,6-hexanetriol made by the method of Example I | 71 |
| Benzyldimethylamine | 0.7 |

The product was a very light-colored, tough, cross-linked material with excellent impact strength. To illustrate its superior impact strength it is compared with Polyether A cured with 80 phr hexahydrophthalic anhydride under the same conditions.

| | Tris maleic half ester of 1, 2, 6-hexanetriol | Hexahydrophthalic anhydride |
|---|---|---|
| Izod impact strength (ft.-lb./in. at notch) | 1.87 | 0.35 |
| Tensile strength, p.s.i. | 9,800 | 9,600 |

*Example V*

Similar good results with respect to cure and impact strength are obtained when the tris maleic acid half ester of 1,2,6-hexanetriol is used to cure Polyether B of U.S. 2,633,458 in the same way.

*Example VI*

The new half esters can be used with diepoxides to cure polycarboxyl rubbers as follows: To 10 grams (0.0036 eq.) of a carboxy terminated linear polybutadiene, were added 0.49 grams (0.0036 eq.) of the tri-maleic half ester of hexanetriol and 1.72 grams (.0093 eq.) of the polyepoxide, copolymer A, of U.S. 2,633,458 referred to in Example IV and 0.24 gram of benzyl dimethyl amine as catalyst. The carboxy terminated linear polybutadiene rubber was one having an average molecular weight of 3150 and an iodine number of 427. It was made by anionic polymerization of butadiene followed by conversion of the terminal groups of the chains to carboxylic acid groups. This composition was mixed at ambient temperature and cured for 48 hours at 80° C. in a plastic curing cup.

Good results are also obtained when the half esters of Examples II, III and IV or mixtures thereof are used in the same way for curing the same or other polyepoxides.

Especially good results have been obtained in curing glycidyl polyethers with the new compounds. These glycidyl polyethers are obtainable by reacting epichlorhydrin with a polyhydric phenol or alcohol in an alkaline medium. There is preferably used glycidyl polyether of a polyhydric phenol, including pyrogallol and phloroglucinol, but particularly of a dihydric phenol. Such polyethers are obtained by heating the dihydric phenol with epichlorhydrin at about 50° C. to 150° C. using 1 to 2 or more mols of epichlorhydrin per mol of dihydric phenol. Also present is a base, such as sodium or potassium hydroxide in slight stoichiometric excess to the epichlorhydrin, i.e., about 2% to 30%. The heating is continued for several hours to effect the reaction and the product is then washed free of salt and base. The product, instead of being a single simple compound, is generally a complex mixture of glycidyl polyethers, but the principal product may be represented by the formula

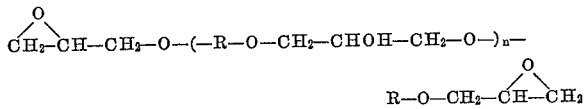

wherein *n* is an integer of the series 0, 1, 2, 3 . . . and R represents the divalent hydrocarbon radical of the dihydric phenol. While for any single molecule of the polyether *n* is an integer, the fact that the obtained polyether is a mixture of compounds causes the determined value for *n*, e.g., from molecular weight measurement, to be an average which is not necessarily zero or a whole number. Although the polyether is a substance primarily of the above formula, it may contain some material with one or both of the terminal glycidyl radicals in hydrated form.

The simplest of such polyethers is the diglycidyl diether of a dihydric phenol. It contains a single divalent aromatic hydrocarbon radical from the dihydric phenol and has two glycidyl radicals linked thereto by ethereal oxygen atoms. More generally, the polyether of dihydric phenols is of more complex character and contains two or more aromatic hydrocarbon radicals alternating with glyceryl groups in a chain which are linked together by intervening ethereal oxygen atoms. Preferred polyethers are those from 2,2-bis-(4-hydroxyphenyl)propane.

Polyepoxyesters are another type of polyepoxide for which the new half esters are particularly good curing agents. One example of these polyepoxyesters with which the new compounds are especially useful is 3,4-epoxy-cyclohexymethyl 3,4-epoxycyclohexylcarboxylate, but any of the other known polyepoxyesters can be similarly cured.

More complete descriptions of polyepoxides which can be cured advantageously with the new half esters of the present invention will be found, for example, in U.S. Patents 2,633,458 previously referred to; 2,735,829; 2,848,426 and 2,901,464. These half esters can also be used successfully as substitutes for the curing agents of U.S. Patent 2,965,610, for example. Especially good results are obtained when curing rubbery epoxy compositions with the half esters of ethylene dicarboxylic acids of the previously described unique structure.

Ordinarily about 0.5 to about 1.5 equivalents of acid in the tri-half ester will be used per epoxy equivalent of the material to be cured, preferred proportions being usually about .8 to about 1 equivalent per epoxy equivalent.

The cure can usually be effected slowly at temperatures as low as about 20° C., but conversion to tough products is usually more suitably carried out at about 50° to about 280° C., excellent results being generally obtained at about 90° to about 200° C. Catalysts can be used advantageously in amounts of about 0.01 to 5% by weight of the polyepoxide to promote more rapid cure by the new half esters of the invention. Suitable catalysts are, for example, tertiary amines such as pyridine, dimethyl aniline, dimethylethanol amine, etc., amine salts as, for instance, the hydrochlorides, sulfates and acetates of the foregoing amines or phosphines such as triphenyl tributyl phosphine or the like.

It will thus be seen that the invention offers many advantages. It is capable of considerable modification. One can, for example, make the half-esters of the specified triols and halo-substituted maleic and fumaric acids in the same way as the half-esters of the unsubstituted acids. The half-esters of chloro- and bromo-maleic acid made by reacting mono-chloro- or mono-bromo-maleic anhydride by the method of Example I, for instance, are particularly useful new compounds which are intended to be within the scope of the appended claims. It will therefore be understood that the invention is not restricted to the examples which have been given by way of illustration nor by any theory proposed in explanation of the improved results which are obtained.

I claim as my invention:

1. A tri-half ester of a triol of 6 to 10 carbon atoms per molecule and a dicarboxylic acid, said ester having the formula:

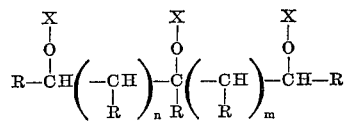

wherein X is the acid residue of an acid selected from the group consisting of maleic and fumaric, each R independently is selected from the group consisting of hydrogen atoms and lower alkyl radicals of not more than 3 carbon atoms, $n$ is an integer from zero to one, and $m$ is an integer equal to at least three but not more than seven minus $n$.

2. Tris maleic acid half esters of trihydroxyalkanes of 6 to 10 carbon atoms in the alkane chain having two of the esterified hydroxy groups directly linked to terminal carbon atoms of the chain and the third esterified hydroxy group directly linked to a carbon atom which is separated by not more than one intervening carbon atom from one of said terminal carbon atoms.

3. Tris maleic acid half ester of 1,2,6-trihydroxyalkane having 6 to 10 carbon atoms in the alkane chain.

4. The tris maleic acid half ester of 1,2,6-hexanetriol.

5. The tris maleic acid half ester of 2,5-dimethyl-1,2,6-hexanetriol.

6. Tris fumaric acid half esters of trihydroxyalkanes of 6 to 10 carbon atoms in the alkane chain having two of the esterified hydroxy groups attached to adjacent carbon atoms and the third esterified hydroxy group attached to a carbon atom which is separated by at least three carbon atoms from the nearest esterified hydroxy substituted carbon atom.

7. The tris fumaric acid half ester of 1,2,6-hexanetriol.

References Cited in the file of this patent
UNITED STATES PATENTS

| | | |
|---|---|---|
| 2,353,696 | De Groote | July 18, 1944 |
| 2,652,424 | De Groote | Sept. 15, 1953 |
| 2,759,967 | Cash et al. | Aug. 21, 1956 |
| 2,768,213 | Whetstone et al. | Oct. 23, 1956 |